(12) United States Patent
Brilliant et al.

(10) Patent No.: US 8,438,832 B1
(45) Date of Patent: May 14, 2013

(54) HIGH TURNING FAN EXIT STATOR

(75) Inventors: Lisa I. Brilliant, Middletown, CT (US);
Becky E. Rose, Colchester, CT (US);
Yuan Dong, Glastonbury, CT (US);
Stanley J. Balamucki, The Villages, FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/407,857

(22) Filed: Feb. 29, 2012

Related U.S. Application Data

(60) Provisional application No. 61/593,217, filed on Jan. 31, 2012.

(51) Int. Cl.
*F02K 3/02* (2006.01)

(52) U.S. Cl.
USPC ......................................................... 60/226.1

(58) Field of Classification Search .. 60/226.1; 415/200, 415/211.2, 208.1; 416/229 A, 223 R, 229 R
See application file for complete search history.

(56) References Cited

U.S. PATENT DOCUMENTS

| | | | |
|---|---|---|---|
| 4,829,813 A | | 5/1989 | Syed |
| 5,226,789 A | | 7/1993 | Donges |
| 5,411,370 A | | 5/1995 | Varsik |
| 5,494,404 A | * | 2/1996 | Furseth et al. ............. 415/209.3 |
| 5,584,654 A | | 12/1996 | Schaefer et al. |
| 6,139,259 A | * | 10/2000 | Ho et al. ........................ 415/119 |
| 6,409,469 B1 | | 6/2002 | Tse |
| 7,101,145 B2 | | 9/2006 | Tsuchiya et al. |
| 7,444,802 B2 | * | 11/2008 | Parry ............................ 60/226.1 |
| 7,694,505 B2 | | 4/2010 | Schilling |
| 7,926,290 B2 | | 4/2011 | Johnson |
| 2005/0008494 A1 | | 1/2005 | Tsuchiya et al. |
| 2007/0119150 A1 | * | 5/2007 | Wood et al. ................... 60/226.1 |
| 2008/0131271 A1 | * | 6/2008 | Wood et al. ..................... 415/191 |
| 2008/0141676 A1 | | 6/2008 | Johnson |
| 2008/0159856 A1 | * | 7/2008 | Moniz et al. ................ 415/198.1 |
| 2008/0317588 A1 | * | 12/2008 | Grabowski et al. ......... 415/174.1 |
| 2010/0105516 A1 | * | 4/2010 | Sheridan et al. .............. 475/346 |

OTHER PUBLICATIONS

Gunston, Bill, "Jane's Aero-Engines," Issue Seven, 2000, pp. 510-512.

\* cited by examiner

*Primary Examiner* — Phutthiwat Wongwian
(74) *Attorney, Agent, or Firm* — Carlson, Gaskey & Olds, P.C.

(57) ABSTRACT

A turbine engine includes a fan section that rotates about a longitudinal axis and a compressor section. The turbine engine also includes a fan exit stator located between the fan section and the compressor section, the fan exit stator including an airfoil. The airfoil defines an entrance angle with respect to a leading edge of the airfoil and a line parallel to the longitudinal axis, and the airfoil defines an exit angle with respect to a trailing edge of the airfoil and a line parallel to the longitudinal axis. A difference between the entrance angle and the exit angle is between about 45° and about 65°. The turbine engine also includes a turbine section, and a portion of the compressor section is driven by a portion of the turbine section.

21 Claims, 4 Drawing Sheets

HIGH TURNING FAN EXIT STATOR

CROSS REFERENCE TO RELATED APPLICATIONS

This application claims priority to U.S. Provisional Application No. 61/593,217 which was filed on Jan. 31, 2012.

BACKGROUND OF THE INVENTION

Gas turbine engines can have multiple low pressure compressor stages closed coupled with a fan. A fan exit stator (the first core stream stator behind a fan blade) of the low pressure compressor is closed coupled with a following airfoil and determines an inlet swirl profile of air flowing into the following airfoil. Air exiting a traditional fan exit stator has 15 to 25 degrees of co-rotating swirl when the air arrives at the following airfoil.

SUMMARY OF THE INVENTION

A turbine engine according to an exemplary aspect of the present disclosure includes, among other things, a fan section that rotates about a longitudinal axis and a compressor section. The turbine engine also includes a fan exit stator located between the fan section and the compressor section, the fan exit stator including an airfoil. The airfoil defines an entrance angle with respect to a leading edge of the airfoil and a line parallel to the longitudinal axis, and the airfoil defines an exit angle with respect to a trailing edge of the airfoil and a line parallel to the longitudinal axis. A difference between the entrance angle and the exit angle is between about 45° and about 65°. The turbine engine also includes a turbine section, and a portion of the compressor section is driven by a portion of the turbine section.

In a further non-limited embodiment of any of the foregoing turbine engine embodiments, the turbine engine may include a front center body duct that slopes radially inwardly with respect to a longitudinal axis.

In a further non-limited embodiment of any of the foregoing turbine engine embodiments, the turbine engine may include a low pressure turbine and a low pressure compressor, and the fan section is driven through a geared architecture by the low pressure turbine.

In a further non-limited embodiment of any of the foregoing turbine engine embodiments, the turbine engine may include a fan section and a low pressure compressor that counter-rotate.

In a further non-limited embodiment of any of the foregoing turbine engine embodiments, the turbine engine may include a geared architecture that is a star gear system.

In a further non-limited embodiment of any of the foregoing turbine engine embodiments, the turbine engine may include a geared architecture that is located radially inwardly of a fan exit stator.

In a further non-limited embodiment of any of the foregoing turbine engine embodiments, the turbine engine may include a portion of a pressure side of an airfoil that is substantially parallel to a longitudinal axis.

In a further non-limited embodiment of any of the foregoing turbine engine embodiments, the turbine engine may include a portion of a pressure side of an airfoil is located near a trailing edge of the airfoil.

In a further non-limited embodiment of any of the foregoing turbine engine embodiments, the turbine engine may include an entrance angle that is between about 45° to about 55°.

In a further non-limited embodiment of any of the foregoing turbine engine embodiments, the turbine engine may include a difference between an air inlet angle and an air outlet angle between about 45° and about 60°.

A turbine engine according to another exemplary aspect of the present disclosure includes, among other things, a fan section that rotates about a longitudinal axis and a compressor section including a low pressure compressor and a high pressure compressor. The turbine engine includes a fan exit stator located between the fan section and the compressor section, the fan exit stator including an airfoil. The airfoil defines an entrance angle with respect to a leading edge of the airfoil and a line parallel to the longitudinal axis, and the airfoil defines an exit angle with respect to a trailing edge of the airfoil and a line parallel to the longitudinal axis. A difference between the entrance angle and the exit angle is between about 45° and about 65°. The turbine engine includes a combustor in fluid communication with the compressor section and a turbine section in fluid communication with the combustor. The turbine section includes a low pressure turbine and a high pressure turbine, and the fan section is driven through a geared architecture by the low pressure turbine.

In a further non-limited embodiment of any of the foregoing turbine engine embodiments, the turbine engine may include a front center body duct that slopes radially inwardly with respect to a longitudinal axis.

In a further non-limited embodiment of any of the foregoing turbine engine embodiments, the turbine engine may include a low pressure turbine and a low pressure compressor, and the fan section is driven through a geared architecture by the low pressure turbine.

In a further non-limited embodiment of any of the foregoing turbine engine embodiments, the turbine engine may include a fan section and a low pressure compressor that counter-rotate.

In a further non-limited embodiment of any of the foregoing turbine engine embodiments, the turbine engine may include a geared architecture that is a star gear system.

In a further non-limited embodiment of any of the foregoing turbine engine embodiments, the turbine engine may include a geared architecture that is located radially inwardly of a fan exit stator.

In a further non-limited embodiment of any of the foregoing turbine engine embodiments, the turbine engine may include a portion of a pressure side of an airfoil that is substantially parallel to a longitudinal axis.

In a further non-limited embodiment of any of the foregoing turbine engine embodiments, the turbine engine may include a portion of a pressure side of an airfoil is located near a trailing edge of the airfoil.

In a further non-limited embodiment of any of the foregoing turbine engine embodiments, the turbine engine may include an entrance angle that is between about 45° to about 55°.

In a further non-limited embodiment of any of the foregoing turbine engine embodiments, the turbine engine may include a difference between an air inlet angle and an air outlet angle between about 45° and about 60°.

These and other features of the present invention can be best understood from the following specification and drawings, the following of which is a brief description.

DETAILED DESCRIPTION OF THE PREFERRED EMBODIMENTS

Figure 1:
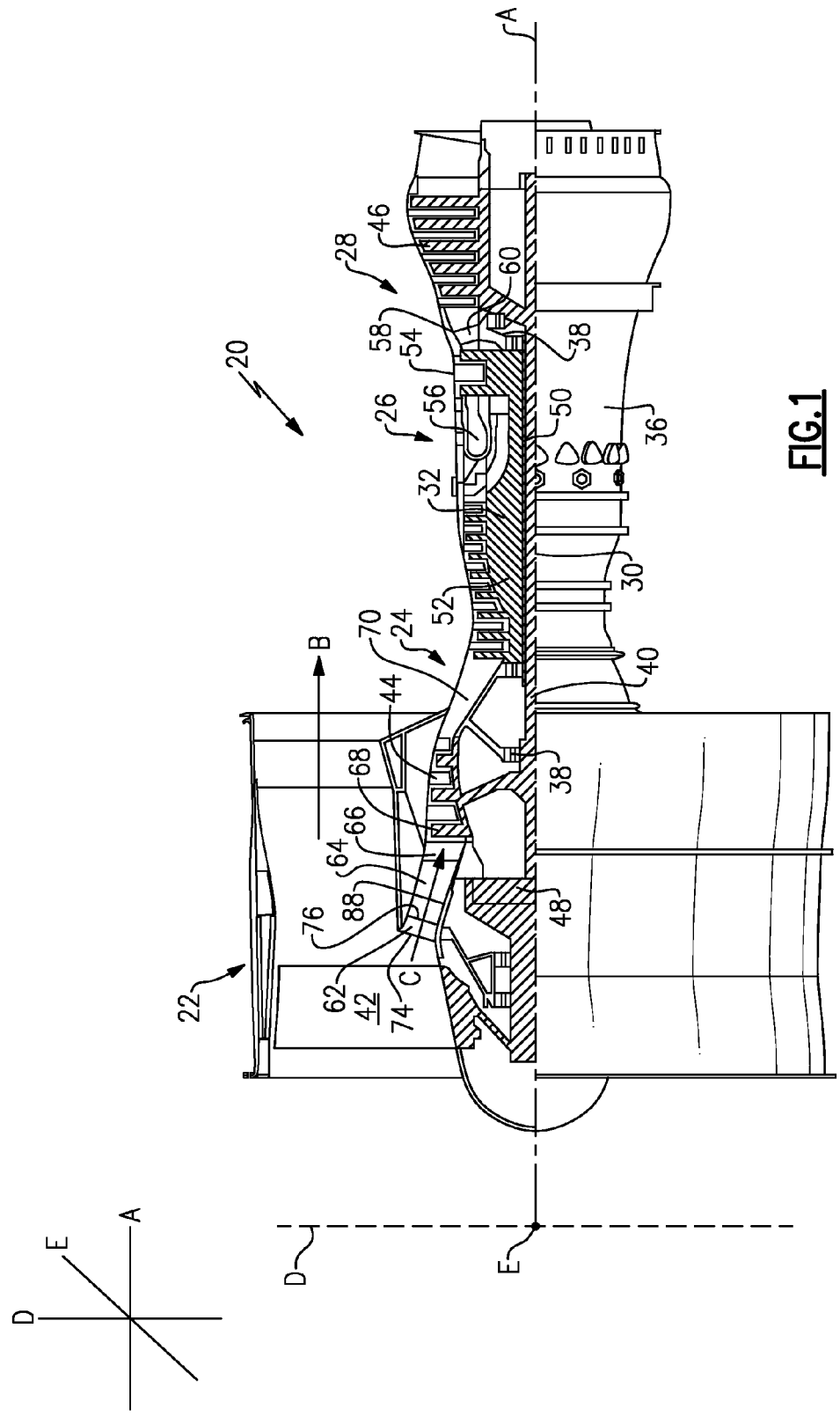
FIG. 1 illustrates a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include for example, a three-spool design, an augmentor section, and different arrangements of sections among other systems or features.

Although depicted as a geared turbofan gas turbine engine in the disclosed non-limiting embodiment, it should be understood that the concepts described herein are not limited to use with geared turbofans as the teachings may be applied to other types of turbine engines.

The fan section 22 drives air along a bypass flowpath B while the compressor section 24 drives air along a core flowpath C for compression and communication into the combustor section 26 then expansion through the turbine section 28.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The geared architecture 48 connects the low pressure compressor 44 to the fan 42, but allows for rotation of the low pressure compressor 44 at a different speed and/or direction than the fan 42.

The high speed spool 32 includes an outer shaft 50 that interconnects a high pressure compressor 52 and a high pressure turbine 54.

A combustor 56 is arranged between the high pressure compressor 52 and the high pressure turbine 54.

A mid-turbine frame 58 of the engine static structure 36 is arranged generally between the high pressure turbine 54 and the low pressure turbine 46. The mid-turbine frame 58 further supports bearing systems 38 in the turbine section 28.

The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path. The turbines 46, 54 rotationally drive the respective low speed spool 30 and high speed spool 32 in response to the expansion.

The engine 20 is in one example a high-bypass geared aircraft engine. In a further example, the engine 20 bypass ratio is greater than about six (6:1) with an example embodiment being greater than ten (10:1). The geared architecture 48 is an epicyclic gear train (such as a planetary gear system or other gear system) with a gear reduction ratio of greater than about 2.3 (2.3:1). The low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle.

In one disclosed embodiment, the engine 20 bypass ratio is greater than about ten (10:1), and the fan diameter is significantly larger than that of the low pressure compressor 44. The low pressure turbine 46 has a pressure ratio that is greater than about five (5:1). The geared architecture 48 may be an epicycle gear train, such as a planetary gear system or other gear system, with a gear reduction ratio of greater than about 2.3 (2.3:1). It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 feet, with the engine at its best fuel consumption, also known as "bucket cruise Thrust Specific Fuel Consumption ('TSFC')," is the industry standard parameter of lbm of fuel being burned per hour divided by lbf of thrust the engine produces at that minimum point.

"Fan pressure ratio" is the pressure ratio across the fan blade alone. The fan pressure ratio as disclosed herein according to one non-limiting embodiment is less than about 1.6.

"Low corrected fan tip speed" is the actual fan tip speed in feet per second divided by an industry standard temperature correction of $[(Tambient\ deg\ R)/518.7]^{0.5}$]. The "Low corrected fan tip speed" as disclosed herein according to one non-limiting embodiment is less than about 1150 feet per second (351 meters per second).

The low pressure compressor 44 and the fan 42 are driven by a common low pressure turbine 46. The geared architecture 48 includes components that spin and move in opposing directions and allows for rotation of the low pressure compressor 44 at a different speed and/or direction than the fan 42. Therefore, the geared architecture 48 can allow for counter-rotation of the fan 42 and the low pressure compressor 44, which can increase the amount of swirl in the airflow. In one embodiment, the system has a star gear system so that the fan 42 and the low pressure compressor 44 counter-rotate.

Figure 2:
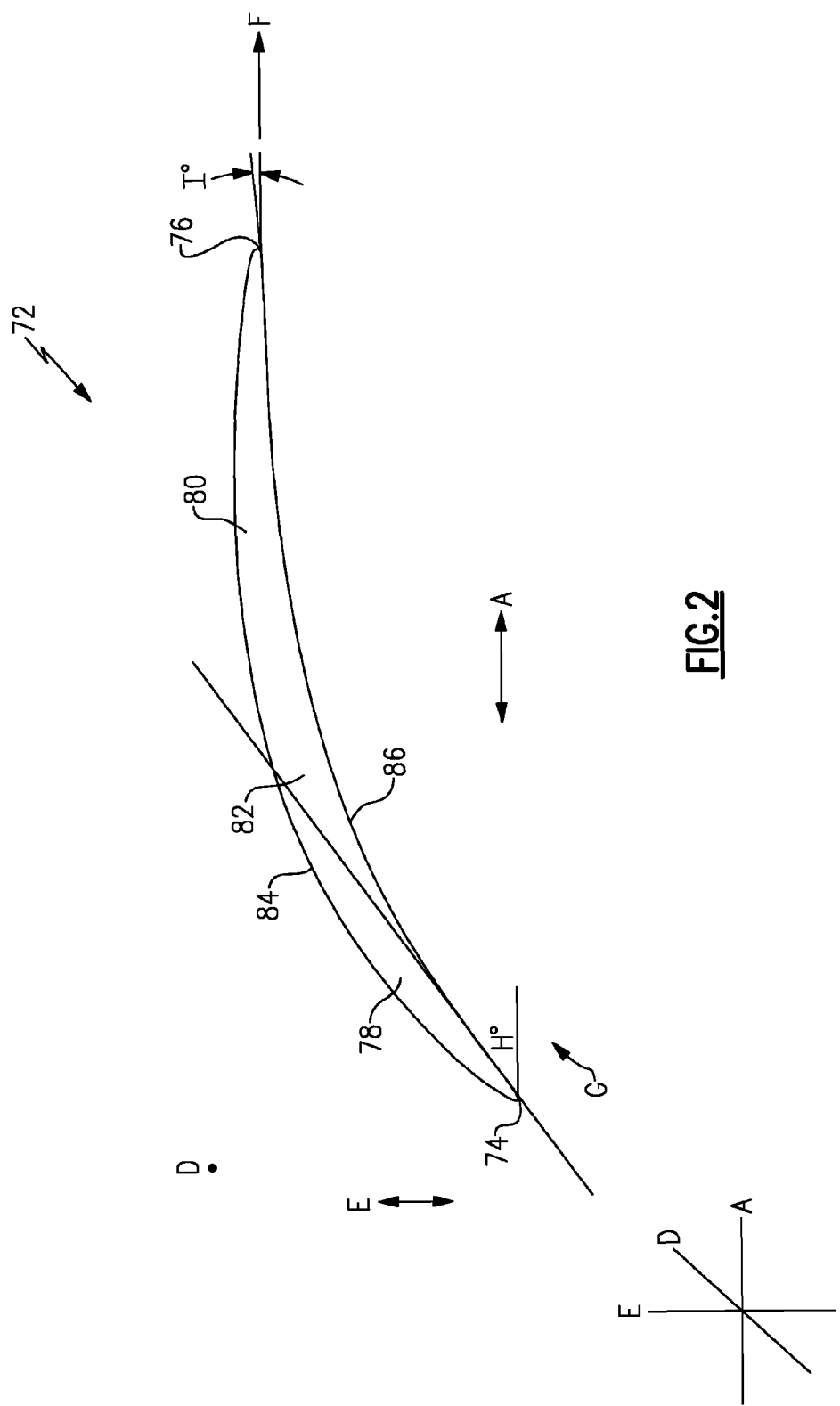
FIG. 2 illustrates a top view of a high turning airfoil of a fan exit stator of the gas turbine engine and angles of the air flow paths.
Figure 3:
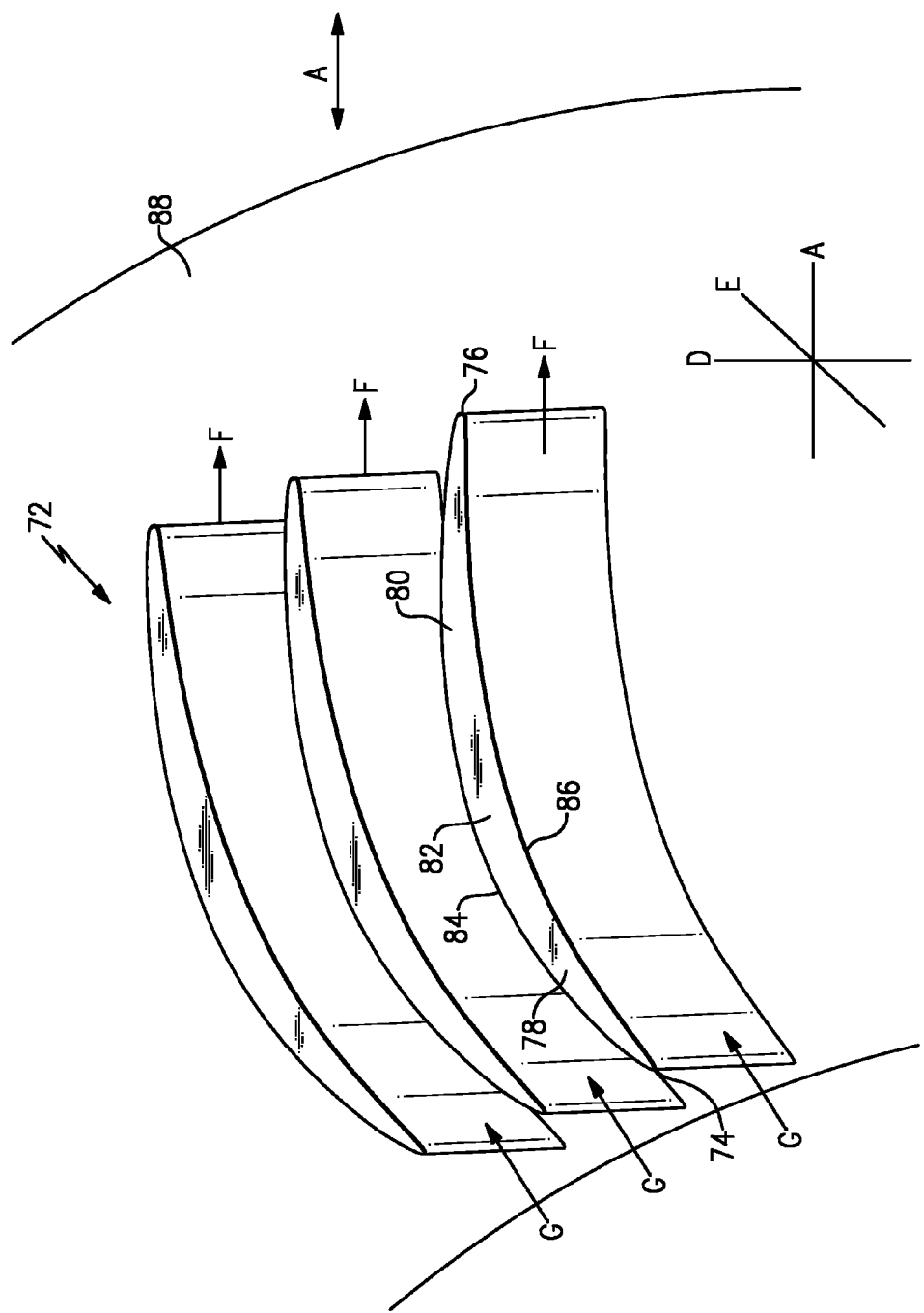
FIG. 3 illustrates a perspective view of a plurality of high turning airfoils attached to a fixed case.

Referring to FIGS. 2 and 3, with continued reference to FIG. 1, the gas turbine engine 20 includes a plurality of fan exit stators 62 positioned around the longitudinal axis A. The fan exit stators 62 function as high turning airfoils to remove a substantial circumferential flow component from air exiting the fan section 22. FIG. 2 illustrates a top view of an airfoil 72 of a fan exit stator 62 when viewed along an axis D. FIG. 3 illustrates a perspective view of a plurality of airfoils 72 attached to an outer surface of a fixed case 88. The fixed case 88 extends circumferentially around the longitudinal axis A, and the plurality of airfoils 72 circumferentially surround the longitudinal axis A. The airfoil 72 of FIG. 2 is shown from a tangential perspective with respect to the longitudinal axis A (that is, the airfoil 72 is shown as a top view with respect to FIG. 1). An axis E is perpendicular to both the axis D and the longitudinal axis A (shown extending into the page of FIG. 1).

The airfoil 72 includes a body portion 82 having a suction side 84, a pressure side 86, a leading edge 74 where the suction side 84 and the pressure side 86 contact, and a trailing edge 76 where the suction side 84 and the pressure side 86 contact.

A forward section 78 of the airfoil 72 located near the leading edge 74 extends at an angle relative to the longitudinal axis A, while slightly curving toward a plane perpendicular to the longitudinal axis A. In one example, an aft section 80 of the airfoil 72 located near the trailing edge 76 includes a profile that curves toward a plane perpendicular to the longitudinal axis A until the pressure side 86 is substantially parallel to the longitudinal axis A.

Continuing to refer to FIGS. 2 and 3, air enters the fan exit stators 62 in a direction G. The pressure side 86 of the aft section 80 of the airfoil 72 guides the entering air so that upon exiting the fan exit stator 62, the air flow is in an axial direction F. The turn of air flow provided by the example fan exit stators 62 reduces the circumferential components, or swirl in the air flow before exiting the fan exit stators 62. Air then flows through a front center body duct 64 along the path C in an axial direction with little or no circumferential swirl. In one example, there is less than about 5° of swirl relative to an axial direction remaining in the air when exiting the fan exit stators 62. In one example, there is less than about 10° of swirl relative to an axial direction remaining in the air when exiting the fan exit stators 62.

In one example, as shown in FIG. 2, air enters the fan exit stators 62 in the direction G at an angle H° with respect to a line parallel to the longitudinal axis A. Air exits the fan exit stators G in the direction F at an angle I° with respect to a line parallel to the longitudinal axis A. In one example, a difference between the angle H° and the angle I° is between about 45° and about 60°. In another example, a difference between the angle H° and the angle I° is between about 45° and about 65°. In one example, the air exits the fan exit stators at an angle I° between about 0 and about 10°. In another example, the air exits the fan exit stators at an angle I° between about 0 and about 5°

Figure 4:
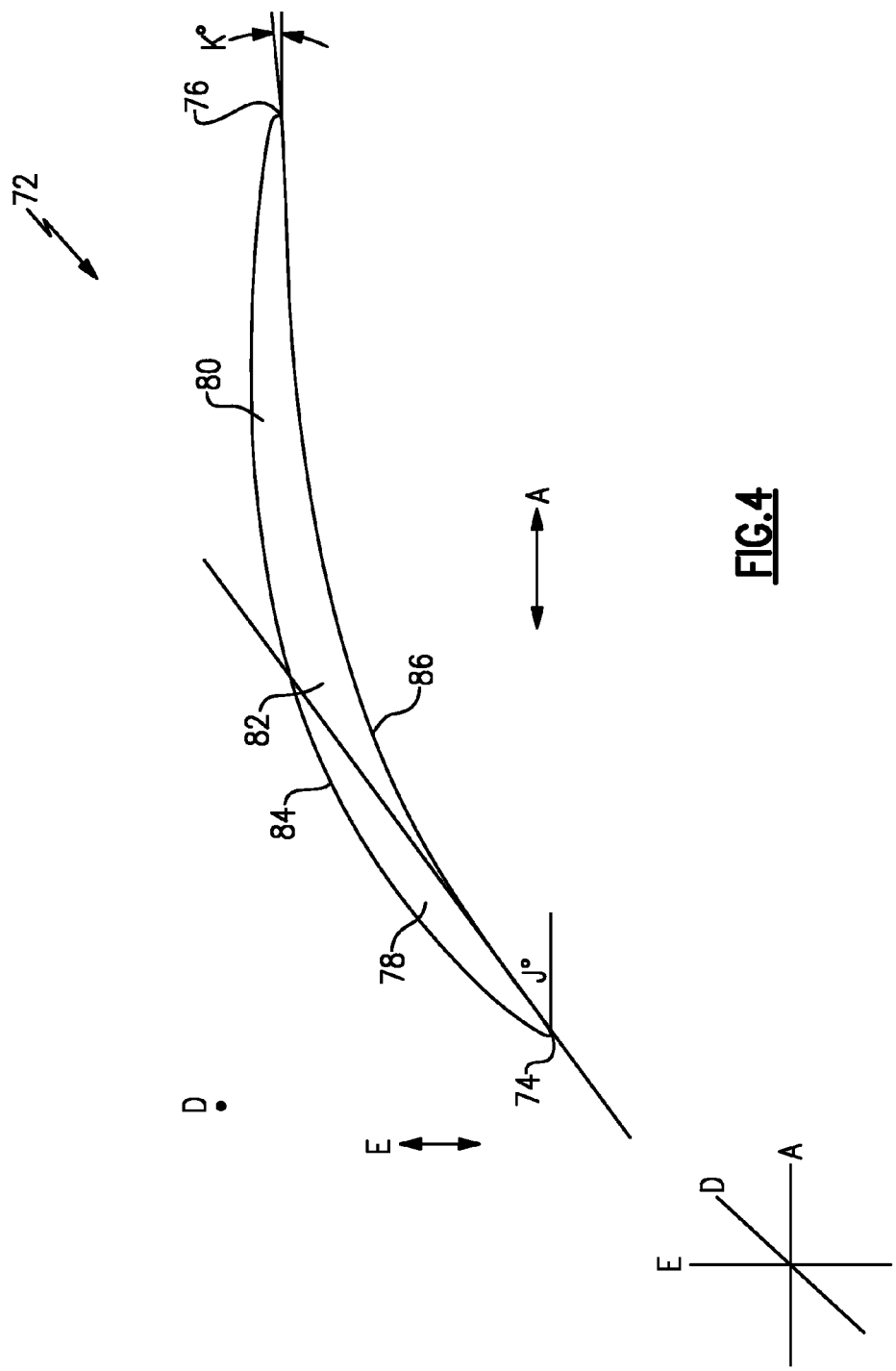
FIG. 4 illustrates a top view of a high turning airfoil of a fan exit stator of the gas turbine engine and angles of the airfoil.

With reference to FIG. 4, the airfoil 60 defines an entrance angle J° with respect to the leading edge 74 of the airfoil 72 and a line parallel to the longitudinal axis A and an exit angle K° with respect the trailing edge 76 of the airfoil 72 and a line parallel to the longitudinal axis A. In one example, the entrance angle J° is about 45° to about 55°, and a difference between the entrance angle J° and the exit angle K° is between about 45° and about 65°. In another example, the entrance angle J° is about 45° to about 55°, and a difference between the entrance angle J° and the exit angle K° is between about 45° and about 60°

Air exiting the fan section 22 flows to the low pressure compressor 44. The air entering the low pressure compressor 44 first flows past the fan exit stators 62 and then through a front center body duct 64. The front center body duct 64 slopes radially inwardly towards the longitudinal axis A in the direction of airflow, reducing both the distance that the air flowing along the flow path C must travel in the front center body duct 64 and pressure losses in the front center body duct 64. Moreover, reducing the circumferential component of airflow through the front center body duct reduces aerodynamic loading on the front center body duct 64. Although the air flow is directed inwardly by the front center body duct 64, air flows substantially parallel to the longitudinal axis A when viewed with respect to the axis D.

The air with reduced swirl then flows through inlet guide vanes 66 and first rotors 68 of the low pressure compressor 44. If the low pressure compressor 44 is counter-rotating, the fan exit stators 62 reduce the turning requirement of the air by the inlet guide vanes 66 to reduce pressure losses through the variable inlet guide vane 66. The air exiting the low pressure compressor 44 flows through an intermediate case 70 and then enters the high pressure compressor 52.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A turbine engine comprising:
   a fan section that rotates about a longitudinal axis;
   a compressor section;
   a fan exit stator located at a core engine inlet between the fan section and the compressor section, the fan exit stator including an airfoil, wherein the airfoil defines an entrance angle with respect to a leading edge of the airfoil and a line parallel to the longitudinal axis, the airfoil defines an exit angle with respect to a trailing edge of the airfoil and a line parallel to the longitudinal axis, and a difference between the entrance angle and the exit angle is between about 45° and about 65°, wherein a portion of a pressure side of the airfoil is substantially parallel to the longitudinal axis; and
   a turbine section, wherein a portion of the compressor section is driven by a portion of the turbine section.

2. The turbine engine as recited in claim 1 including a front center body duct that slopes radially inwardly with respect to the longitudinal axis, wherein air enters the front center body after flowing past the fan exit stator.

3. The turbine engine as recited in claim 2 wherein the front center body duct reduces a distance and a pressure loss of the air.

4. The turbine engine as recited in claim 1 wherein the portion of the turbine section is a low pressure turbine and the portion of the compressor section is a low pressure compressor, and the fan section is driven through a geared architecture by the low pressure turbine.

5. The turbine engine as recited in claim 4 wherein the fan section and the low pressure compressor counter-rotate.

6. The turbine engine as recited in claim 4 wherein the geared architecture is a star gear system.

7. The turbine engine as recited in claim 4 wherein the geared architecture is located radially inwardly of the fan exit stator.

8. The turbine engine as recited in claim 1 wherein the portion of the pressure side of the airfoil is located near the trailing edge of the airfoil.

9. The turbine engine as recited in claim 1 wherein the entrance angle is between about 45° to about 55°.

10. The turbine engine as recited in claim 1 wherein the difference between the entrance angle and the exit angle is between about 45° and about 60°.

11. The turbine engine as recited in claim 10 wherein the entrance angle is between about 45° to about 55°.

12. A turbine engine comprising:
    a fan section that rotates about a longitudinal axis;
    a compressor section including a low pressure compressor and a high pressure compressor;
    a fan exit stator located at a core engine inlet between the fan section and the compressor section, the fan exit stator including an airfoil, wherein the airfoil defines an entrance angle with respect to a leading edge of the airfoil and a line parallel to the longitudinal axis, the airfoil defines an exit angle with respect to a trailing edge of the airfoil and a line parallel to the longitudinal axis, and a difference between the entrance angle and the exit angle is between about 45° and about 65°, wherein a portion of a pressure side of the airfoil is substantially parallel to the longitudinal axis;

a combustor in fluid communication with the compressor section; and a turbine section in fluid communication with the combustor, wherein the turbine section includes a low pressure turbine and a high pressure turbine, and the fan section is driven through a geared architecture by the low pressure turbine.

13. The turbine engine as recited in claim 12 wherein a front center body duct that slopes radially inwardly with respect to the longitudinal axis, wherein air enters the front center body after flowing past the fan exit stator.

14. The turbine engine as recited in claim 13 wherein the front center body duct reduces a distance and a pressure loss of the air.

15. The turbine engine as recited in claim 12 wherein the fan section and the low pressure compressor counter-rotate.

16. The turbine engine as recited in claim 12 wherein the geared architecture is a star gear system.

17. The turbine engine as recited in claim 12 wherein the geared architecture is located radially inwardly of the fan exit stator.

18. The turbine engine as recited in claim 12 wherein the portion of the pressure side of the airfoil is located near a trailing edge of the airfoil.

19. The turbine engine as recited in claim 12 wherein the entrance angle is between 45° to 55°.

20. The turbine engine as recited in claim 12 wherein the difference between the entrance angle and the exit angle is between about 45° and about 60°.

21. The turbine engine as recited in claim 20 wherein the entrance angle is between about 45° to about 55°.

\* \* \* \* \*